July 27, 1937.    G. FLEISCHEL    2,087,885
LEVER CONTROLLED SYSTEM
Filed July 11, 1931    2 Sheets-Sheet 1
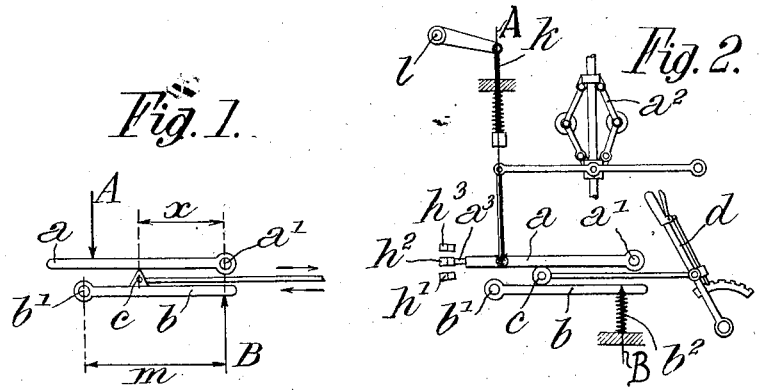
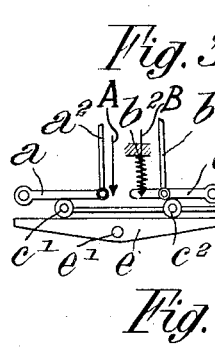
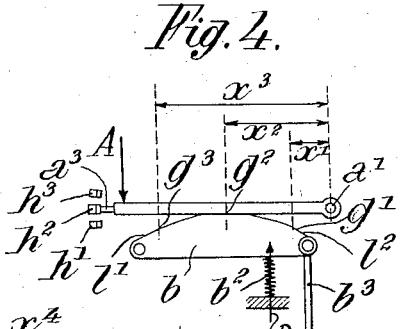
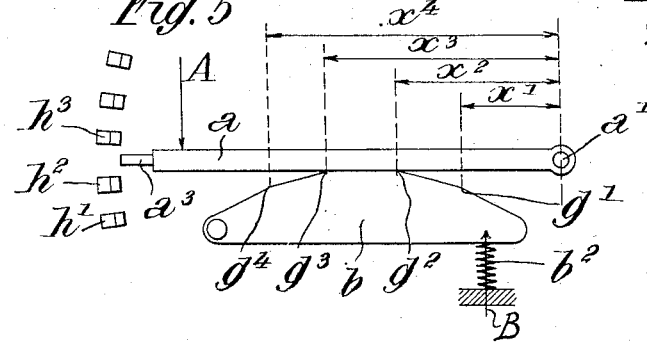
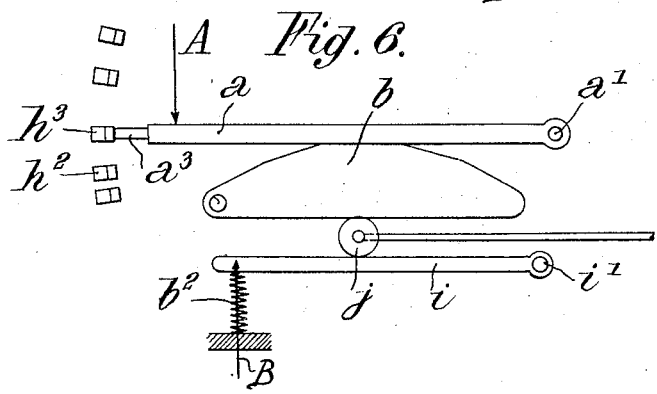
Gaston Fleischel
Inventor
by Louis Barnett
Attorney

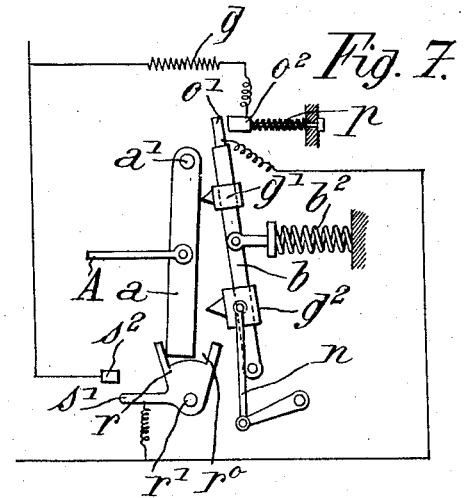
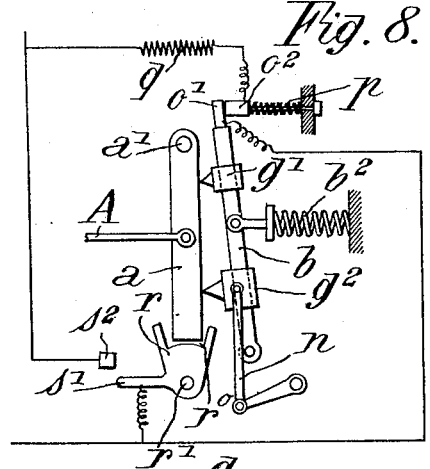
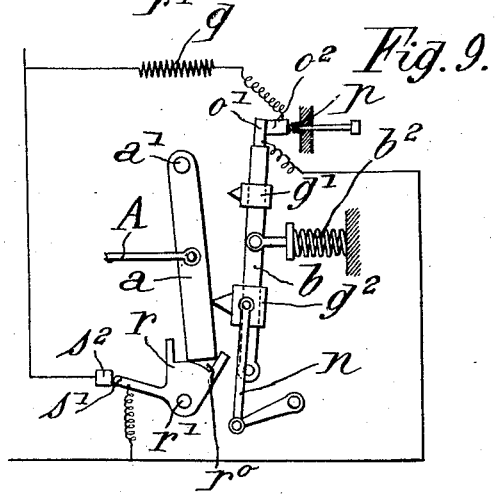

Patented July 27, 1937

2,087,885

UNITED STATES PATENT OFFICE 2,087,885

LEVER CONTROLLED SYSTEM

Gaston Fleischel, Bleneau (Yonne), France

Application July 11, 1931, Serial No. 550,205
In Belgium September 27, 1930

10 Claims. (Cl. 201—48)

The present invention relates to lever controlled systems.

One of the objects of the invention is to provide means for counterbalancing a variable force acting on a lever by means including a constant force acting on a second lever.

Another object is to provide means for varying the effect of a force acting on a first lever in the course of its being transmitted to a second lever.

An additional object is to provide means operating by the movement of one or the other of the aforesaid levers to control a device responsive to variations in speed or any other operating variable of a motor.

A further object is to provide means for graduating the action of a clutch.

Still another object is to provide lever systems capable of effecting a graduated remote or immediate control.

Still further objects will appear in the course of the detailed description now to be given with reference to the accompanying drawings, in which:

Fig. 1 is a diagram showing the principle upon which the invention is based;

Figs. 2 to 6 show five possible variants of the principle illustrated in Fig. 1;

Figs. 7 to 9 show a sixth form of the invention applied to the particular problem of controlling the automatic clutch of an automobile.

Referring to Fig. 1 of the drawings, there is shown a pair of substantially parallel levers $a$ and $b$ pivotally mounted at $a^1$ and $b^1$ respectively, and a displaceable element $c$ mounted between said levers. From an inspection of this figure, it will at once be seen that an antagonistic force B applied to lever $b$ may be maintained substantially constant despite variation in the magnitude of a force A acting on lever $a$ by simply displacing element $c$ toward, or away from, pivotal axis $a^1$. If it be assumed that force B be applied to lever $b$ at a point in line with axis $a^1$ and if the distance of element $c$ from said axis be designated by the letter $x$, the action of variable force A on element $c$ is expressed by $$A\frac{m}{x}$$

where $m$ is the distance between the points $a^1$ and $b^1$. Similarly, the action of constant force B is expressed by $$B\frac{m}{m-x}$$

When the system is in an equilibrium, the following relations are true:

$$A\frac{m}{x}=B\frac{m}{m-x} \text{ or } A=B\frac{x}{m-x}$$

It will thus be seen that a constant force B may be utilized to balance the action of a variable force A whatever the momentary value of the latter may be by simply changing the magnitude of distance $x$. A similar effect may be obtained even when force B is applied to lever $b$ at some point other than that in line with axis $a^1$.

In the various constructive embodiments hereinafter to be described, force A will be assumed to be produced as a result of variations of speed in some such speed responsive device as a centrifugal governor.

Figs. 2 to 4 show the invention applied to devices wherein displacements of element $c$ are a function of variations in variable force A. The various lever systems shown therein are designed to control appropriate mechanical, electrical or servo-motor assemblies to carry out any one of a number of operations. In each of the lever controlled systems shown in these figures, rupture of equilibrium takes place as soon as the value of variable force A becomes greater or less than certain predetermined values.

In the form of device shown in Fig. 2, a centrifugal governor $a^2$, driven by a motor or the like, reacts on lever $a$ to displace a contact $a^3$ across a series of terminals $h^1$, $h^2$ and $h^3$, a spring $b^2$ providing the antagonistic force B of constant value. Element $c$ is here made in the form of a roller simultaneously contacting with levers $a$ and $b$ and displaceable therebetween by means of a hand lever $d$. The terminals designated by the letter $h$ with various indices may be connected to devices for shifting gears in a motor or to effect any other operation or series of operations depending on variations in the speed of governor $a^2$. If desired, a rod $k$ connected to a lever $l$ controlling the throttle valve of a carburetor may be mounted in the path of movement of the lever-and-link system connected to $a^2$ whereby said valve may be closed when speed of the governor exceeds a predetermined value. It will at once be seen that, when hand lever $d$ is manipulated to displace roller $c$, the equilibrium of the lever control system will be modified in the manner indicated by the algebraic expressions derived and discussed in connection with Fig. 1.

The structure shown in Fig. 3 is designed to permit larger variations in the limiting values of force A. To this end, an intermediate, pivoted lever $e$, is interposed between levers $a$ and $b$ and oscillates about a central point $e^1$. Levers $a$ and $b$ are positioned in line with one another on opposite sides of point $e^1$ and a pair of rollers $c^1$ and $c^2$ are mounted to slide in contact with said levers under the action of lever $d$. Force A is transmitted to lever $b$ by means of a rod $a^2$ (the latter being connected to the throttle valve of a motor or to any equivalent element moving as a function of the speed thereof) and acts against constant force B provided by spring $b^2$. As soon as the speed of the motor varies in either direction by a predetermined amount, the equilibrium of lever E is broken and the latter oscillates in one direction or the other and actuates lever $b^3$.

In the form of assembly shown in Figs. 4 to 6, means are shown for obtaining an action equivalent to that of element c by giving lever b (or a) a special form.

Referring to Fig. 4, there is shown a lever b whose upper surface is composed of a flat portion $l^1$ terminating at point $g^3$ situated at distance $x^3$ from point $a^1$ of lever a, a pair of curvilinear portions terminating at points $g^2$ and $g^1$ positioned at distances $x^2$ and $x^1$ respectively from point $a^1$, and a flat portion $l^2$. By making use of the algebraic relation derived in connection with Fig. 1, distances $x^1$, $x^2$ and $x^3$ may be chosen so that, for a spring $b^2$ (force B) of predetermined resilience, force A will produce any desired effect. It will at once be seen that, as lever b oscillates, it contacts with lever a at points designated by the letter g with various indices so as to produce an effect on lever $b^3$ similar to that resulting from the displacement of element c in Fig. 2.

In each of the structures shown in Figs. 1 to 4, when variable force A varies between any two limits, element c may be displaced (or points g in the case of Fig. 4) so that the system remains in equilibrium under the action of antagonistic force B having a momentary constant value. In addition, when roller c (or any predetermined point of the g series of curved lever b) is given any predetermined position, variations in the force A, by rupturing the equilibrium established, may be utilized to produce reactions controlling a system at a distance.

The form of structure shown in Fig. 5 differs from the one already described in Fig. 4 in that the surface of lever b in contact with lever a is made in the form of a series of intersecting planes instead of a curve. The manner in which this device operates is self evident, its action being intermittent rather than continuous.

The assembly illustrated in Fig. 6 combines the advantages of those illustrated in Figs. 4 and 5 with those shown in Figs. 1 to 3. Here, instant constant force $b^2$ reacts on a lever i articulated at $i^1$, and its effective action on lever b (curvilinear or intersecting plane type) may be varied by displacing a roller j.

The following applications may be made of the various systems so far described: The structures shown in Figs. 2 and 3 may be designed so that at predetermined speeds of governor $a^2$, contact $a^3$ moves across terminals of the h series to successively control the lubricating system, the ignition or any other portion of a motor; the one shown in Fig. 4 may be designed so that, for a given value of force B, the centrifugal action of a governor similar to $a^2$ in Fig. 2 (force A) tilts levers a and b so as to make a series of contacts controlling an automatic gear shifting assembly; finally, the structures illustrated in Figs. 5 and 6 may be designed so that, as lever b tilts to bring successive portions of its polygonal surface into contact with lever a, a series of contacts are energized to effect a corresponding series of gear-shifting operations, force A varying as a function of the speed of the motor's driven shaft. In the particular case of the structure shown in Fig. 6, the values for which changes of equilibrium occur may be modified by displacing roller j.

The form of apparatus represented in Figs. 7 to 9 is a modification of those shown in Figs. 5 and 6 wherein the distance between adjacent summits of the polygon formed by the intersecting planes and designated by adjacent letters of the g series may be varied and is designed to be applied, more especially, to an automatic clutch of the type described in the present inventor's copending application, Serial No. 520,090, filed March 4, 1931, which has matured into Patent No. 1,893,644.

For the sake of simplicity, it has been assumed that the clutch is electrically controlled by a centrifugal regulator driven by the motor. The clutch is designed so that, when the motor speed attains a predetermined value, the electric control circuit energizes an electro-magnet to let in the clutch and when the motor speed drops below another predetermined value, the centrifugal regulator opens the circuit and throws out the clutch. The particular structure shown in Figs. 7 to 9 insures progressive letting in of the clutch beyond speeds of any predetermined value by intercalating, seriatum resistances in the electrical control circuit or by successively energizing and deenergizing a plurality of electro-magnetic coils serving to control the clutch. The throwing out of the clutch may, however, be made total for any chosen speed.

The action of the centrifugal regulator (not shown) is transmitted to lever a (force A) and the constant antagonistic force (spring $b^2$) is applied to "polygonal" lever b which, in this special case, is provided with only two vertices $g^1$ and $g^2$, the former being fixed (adjustably) and the latter being displaceable by means of a lever- and-link system n. Lever o carries an insulated contact $o^1$ adapted to move toward and away from a terminal $o^2$ mounted on a resilient support p, said terminal being connected via resistance q to the electrical circuit controlling the electro-magnetic clutch (not shown). The free extremity of lever a engages freely inside a recess $r^0$ formed in a segment r pivotally mounted at $r^1$ and provided with an insulated contact $s^1$, the latter being positioned to oscillate into, and out of, contact with a terminal $s^2$ in series with the clutch control circuit. The recess in segment r is made sufficiently large so that, when lever a is displaced toward the right, the segment itself does not oscillate until a speed is attained surpassing that for which, the displacement of lever b closes the circuit at $o^1$, $o^2$.

The hereinabove described assembly functions in the following manner. When the motor is at rest, force A has zero value and levers a and b occupy the position shown in Fig. 7, the clutch control circuit being open at both points $o^1$, $o^2$, and $s^1$, $s^2$. When the motor speed increases sufficiently so that lever a contacts with point $g^1$ (Fig. 8), contact $o^1$ moves into engagement with terminal $o^2$ so as to partially let in the clutch, the current being limited in value by its passage through resistance q; if the motor speed continues to increase, lever b compresses the spring of resilient support p and lever a moves into contact with segment r, causing the latter to oscillate and closing the circuit at $s^1$, $s^2$ (Fig. 9) so as to let in the clutch completely.

By modifying the position of point $g^2$, the motor operator may vary the speed at which the clutch begins to be let in. Clutch control, it will be noted, is automatic since an excessive letting in of the clutch slows down the motor and diminishes force A so as to again throw out the clutch while an insufficient release of the latter causes the motor speed to increase, increases force A and hastens complete clutch release. When the motor slows down and force A progressively diminishes, lever $a$ moves to the left of the position shown in Fig. 9 thus causing lever $o$ to open the circuit at $o^1$, $o^2$. Nevertheless, the clutch remains completely released since the contact at $s^1$, $s^2$ is maintained. It is only when the motor speed drops to a value for which lever $a$ oscillates sufficiently to displace segment $r$ and break the contact at $s^1$, $s^2$ that the clutch is completely thrown out.

What I claim is:—

1. A control system of the class described comprising a first lever, means for applying a first force of varying value to said first lever, resilient means for producing a second force of predetermined value, means for varying the effective magnitude of said second force of predetermined value, and means including a second lever for transmitting said second force of predetermined value to any one of a plurality of points situated along said first lever, whereby equilibrium between said first and second forces may be obtained.

2. A control system of the class described comprising a first lever, means for applying a first force of varying value to said first lever, resilient means for producing a second force of predetermined value, means including a second lever for transmitting said second force of predetermined value to any one of a plurality of points situated along said first lever, whereby equilibrium between said first and second forces may be obtained and means for varying the point of application of the forces acting on said second lever.

3. In a control of the class described, a pair of levers, resilient means for exerting a force on one of said levers, means for exerting a force of varying magnitude on the second of said levers, an oscillatable element mounted adjacent said levers, and means including a roller operative to maintain said oscillatable element in spaced relation to each of said levers, said means and oscillatable element being operative to establish equilibrium between the forces acting on the various levers.

4. In a control system of the class described an oscillatable element, a pair of levers mounted on opposite sides of the point about which said oscillatable element oscillates, resilient means for applying a force to one of said levers, means for applying a force of varying value to the other of said levers, a pair of rollers interposed between said levers and said oscillatable element and operative to maintain the latter in spaced relation to each of the former and operative to establish equilibrium between the forces acting on the various levers, and means for simultaneously displacing said rollers.

5. In a control system of the class described, a first lever, a second lever having a curvilinear surface positioned to contact with said first lever, means for applying a force to one of said levers, and means for applying a force of varying magnitude to the other of said levers, the curvilinear surface of said second lever being operative to establish equilibrium between the forces acting on the various levers.

6. In a control system of the class described, a first lever, means for applying a force of varying magnitude to said first lever, a second lever having a surface including at least three intersecting planes, said surface being positioned to contact with said first lever, and means for applying a force to said second lever, the points of contact of the two levers operating to establish equilibrium between the forces acting on the various levers.

7. In a control system of the class described, a first lever, means for applying a force of varying magnitude to said first lever, a second lever having a surface of polygonal form positioned to contact with said first lever, a third lever, means for exerting a force on said third lever, and a roller interposed between and coacting with said second and third levers.

8. In a control system of the class described, a first lever, means for applying a force of varying magnitude to said first lever, a second lever, a pair of elements adjustably positioned on said second lever so as to move into contact with said first lever, and means for applying a force to said second lever.

9. A structure as defined in claim 8 in combination with means for displacing one of said elements towards and away from the other.

10. A structure as defined in claim 8 in combination with an oscillatable element having a recess formed therein positioned to engage with the free extremity of said first lever, an electrical contact mounted on said oscillatable element, an electrical contact mounted on the free extremity of said second lever, a first terminal mounted in the path of movement of said first named electrical contact, a second terminal yieldably mounted in the path of movement of said second named electrical contact, and a circuit including a resistance extending between said terminals.

GASTON FLEISCHEL.